US006967429B2

(12) United States Patent
Bachmaier et al.

(10) Patent No.: US 6,967,429 B2
(45) Date of Patent: Nov. 22, 2005

(54) POWER OUTPUT STAGE FOR CAPACITIVE LOADS

(75) Inventors: Georg Bachmaier, Munich (DE); Bernhard Fischer, Toging A. Inn (DE); Bernhard Gottlieb, Munich (DE); Andreas Kappel, Brunnthal (DE); Hans Meixner, Haar (DE); Tim Schwebel, Augsburg (DE); Christian Tump, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 20 days.

(21) Appl. No.: 10/780,556

(22) Filed: Feb. 19, 2004

(65) Prior Publication Data
US 2004/0208042 A1 Oct. 21, 2004

(30) Foreign Application Priority Data
Feb. 19, 2003 (DE) .................................. 103 07 000

(51) Int. Cl.[7] ........................... H02N 2/14; H01L 41/09
(52) U.S. Cl. ............ 310/317; 310/316.01; 310/316.02; 310/316.03; 123/498; 123/478; 318/116
(58) Field of Search ..................... 310/316.1–316.03, 310/317; 318/116; 123/498, 478; 361/156

(56) References Cited

U.S. PATENT DOCUMENTS

| 6,853,114 | B2 * | 2/2005 | Bachmaier et al. .... 310/316.03 |
| 2003/0053284 | A1 * | 3/2003 | Stevenson et al. .......... 361/302 |
| 2003/0164160 | A1 * | 9/2003 | Schrod ........................ 123/490 |
| 2004/0090798 | A1 * | 5/2004 | Oudshoom et al. ............ 363/1 |
| 2004/0095121 | A1 * | 5/2004 | Kernahan et al. ........... 323/283 |

* cited by examiner

Primary Examiner—Darren Schuberg
Assistant Examiner—J. Aguirrechea
(74) Attorney, Agent, or Firm—Young & Thompson

(57) ABSTRACT

A power output stage for capacitive loads includes:
   an energy storage inductance, having one end connected to a reference potential and an opposite end connected on the input side to a power supply connection and on the output side to a secondary energy storage capacitance;
   a primary energy storage capacitance is connected upstream of the energy storage inductance on the input side, and connected on the input side via a primary switching element with a reference potential, and
   a secondary switching element connected in series with the secondary energy storage capacitance (4), characterized in that
the input of the power output stage is clocked by an additional switch.

16 Claims, 1 Drawing Sheet

POWER OUTPUT STAGE FOR CAPACITIVE LOADS

FIELD OF THE INVENTION

Figure 1:
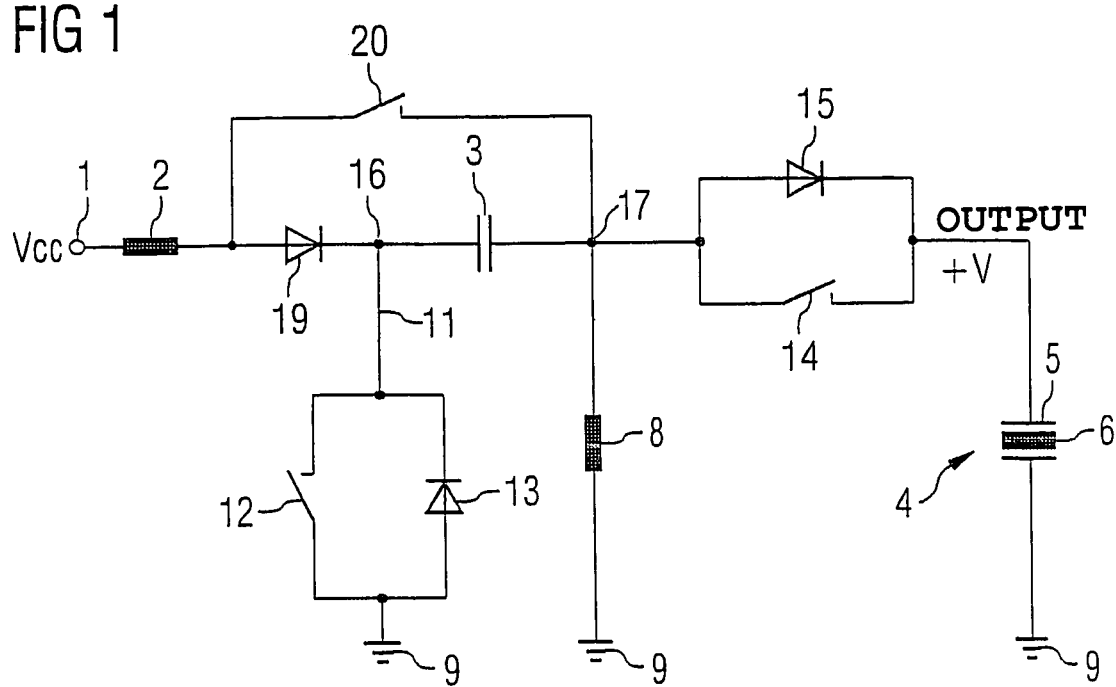

The invention relates to a power output stage or converter circuit having an energy storage inductance, one end of which is connected to a reference potential and which at the opposite end is connected on the input side to a power supply connection and on the output side to a secondary energy storage capacitance, which is connected on the input side to the reference potential.

BACKGROUND OF THE INVENTION

Owing to the urgent need for fuel-saving engines, direct-injection Otto-cycle engines using lean combustion methods are currently being developed. The new generation of engines can achieve a mean fuel saving of up to 15%. Charge stratification is carried out in the combustion chamber when on partial load. This means that the combustion chamber is split into two zones, a first zone with a fuel/air mixture which is capable of being ignited in the vicinity of the spark plugs, and a second zone composed of air and residual gas, which surrounds the first zone and is thermally isolated from the walls of the combustion chamber. Stratification charging is dependent on an extremely late injection time during the compression phase of the engine, and on an extremely short injection time of typically 0.5 ms. As the engine load increases, a transition takes place to homogeneous operation. In this case, the fuel is actually injected during the induction phase, that is to say very early, in order to ensure good, thorough mixing of the air and fuel.

It is particularly advantageous to use piezo actuators or other electrostrictive actuators manufactured using a multilayer technique for operation of the injection valves, since they react with virtually no delay. The piezo actuators or electrostrictive actuators manufactured using a multilayer technique have a layer stack composed of a material whose extent changes when an external voltage is applied in the longitudinal direction. Injection valves which are operated by piezo actuators or electrostrictive actuators can be controlled independently of the piston movement and, furthermore, have the advantage that they can be used to achieve short switching times.

For circuitry purposes, the piezo actuator represents a capacitance which is charged by means of an external applied electrical voltage. Energy is therefore stored in the piezo actuator. Piezo actuators use, for example, switching processes at frequencies of between 10 and 500 Hz for charging and discharging.

The German patent application with the official file reference 101 47 168.8 describes a converter circuit by means of which the energy which is stored in the secondary energy storage capacitance can at least partially be transferred back to the primary energy storage capacitance. This is achieved by additionally fitting a primary energy storage capacitance on one side. The energy which is stored in the secondary energy storage capacitance can result in a current being built up via the energy storage inductance and the secondary energy storage capacitance to this primary energy storage capacitance, in particular by briefly closing a secondary switching element, which current flows again when the secondary switching element is subsequently opened after a short time, and thus charges the primary energy storage capacitance.

Figure 2:
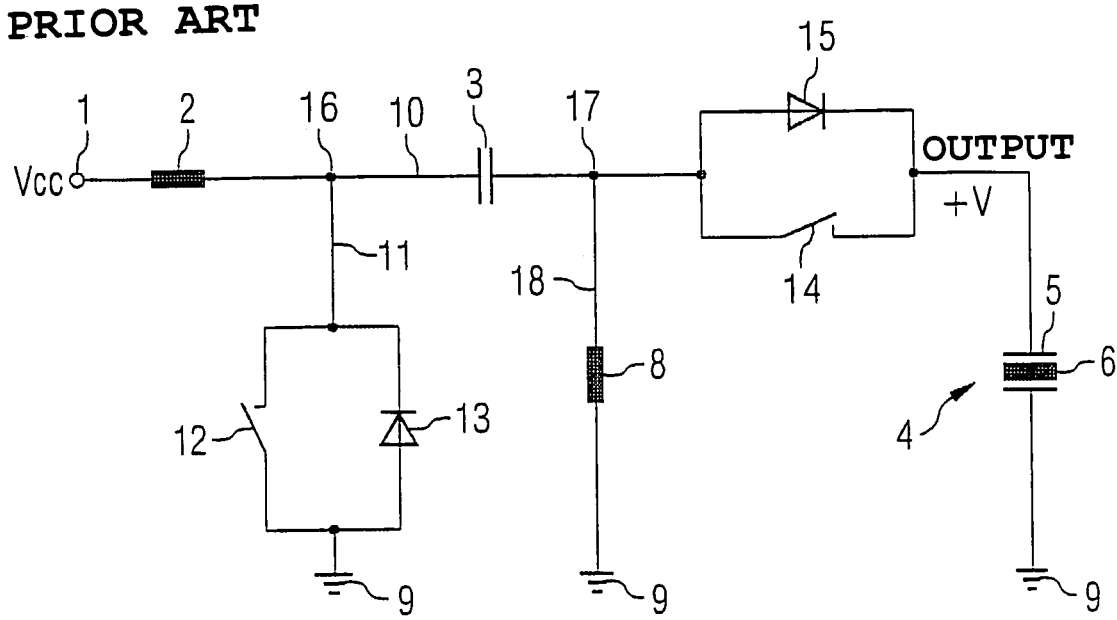

Since, for many applications, the power output stage shall be designed to be as compact as possible, all the components should be checked for volume reduction. However, the power output stages circuit that is shown in FIG. 2, corresponding to the prior art, requires each component to have specific minimum characteristic values, for internal matching. As before, the largest amount of space is in this case consumed by the inductances and capacitances. If, for example, the primary energy storage capacitance is reduced by reducing the nominal capacitance, then this leads to greater potential fluctuation during the charging and discharging processes, which in turn would result in a filter inductor with a higher current load.

SUMMARY OF THE INVENTION

The invention is based on the object of providing a power output stage by means of which electrically capacitively acting actuators with a minimum physical size can be driven with losses that are as low as possible.

The invention is based on the knowledge that the primary energy storage capacitance 3 should be designed to be as small as possible. The necessary supply voltage VCC is not available for many applications. However, a minimum value is necessary for this purpose, in order to ensure the desired dynamic response at the output (+V). Generally, only a supply voltage of 12 V or a maximum of 42 volts is available for operation of piezo injection valves. However, a supply voltage VCC of more than 70 volts is required for operation of a power output stage of this type. The input is clocked by an additional switch 20, which means that there is no need for an additional DC/DC converter.

The components which have been newly introduced in comparison to the prior art are a diode for preventing a reverse current flow into the supply source, and a switch for clocking the input. Bridging the capacitance for a brief time makes it possible on the one hand to vary the voltage on the primary energy storage capacitance and on the other hand to limit the maximum current through the inductance 2. The addition to the circuit means that there is no need for any additional DC/DC converter.

BRIEF DESCRIPTION OF THE INVENTION

One exemplary embodiment will be described in the following text with reference to schematic figures, which do not restrict the invention, in which:

FIG. 1 shows a circuit for a power output stage according to the present invention, and FIG. 2 shows a converter circuit from the prior art.

DETAILED DESCRIPTION OF THE INVENTION

FIG. 2, the prior art, comprises a converter circuit with a power supply connection 1, which is followed by a filter inductance 2. At its end that is remote from the power supply connection 1, the filter inductance 2 is connected to a primary energy storage capacitance 3, for example to a capacitor, and to a secondary energy storage capacitance 4, for example to a piezo actuator. The piezo actuators have a stack of piezo electric material 6, which is in each case embedded between electrodes 5 and whose extent changes when a greater voltage is applied. For the sake of simplicity, the figures show only a single layer of the piezo electric material with the associated electrodes 5. An energy storage inductance 8 is connected to the node point 17 between the primary energy storage capacitance 3 and the secondary energy storage capacitance 4, and its end which is remote from the node point 10 is connected to ground 9. The energy source inductance 8 may be an air-cored coil. Finally, a line 11 which leads to a primary switching element 12 branches off from a line 10 which connects the filter inductance 2 to the primary energy storage capacitance 3. That end of the primary switching element 12 which is remote from the line 10 is likewise connected to ground 9. Furthermore, the primary switching element 12 is bridged by a diode 13 which is reverse-biased when a supply voltage VCC is applied to the power supply connection 1. A secondary switching element 14 is arranged in series with the secondary energy storage capacitance 4, is likewise connected to ground 9, and is bridged by a diode 15. In this case, the diode 15 is forward-biased when a supply voltage VCC is applied to the power supply connection 1.

When a supply voltage VCC is applied to the power supply connection 1 and the primary switching element 12 is open, the primary energy storage capacitance 3 is initially charged until a node point 16 between the lines 10 and 11 is at the potential VCC. The node point 17 is at ground potential at this time.

As the primary switching element 12 is closed, the node point 16 is connected to ground potential. The potential at the node point 17 thus changes to −VCC, so that a current $I_L$ flows through the energy storage inductance 8 via the energy storage capacitance 3, the primary energy storage capacitance 3 and the primary switching element 12. Whilst the primary switching element 12 has been opened, the energy storage inductance 8 maintains the current $I_L$ and in consequence charges the secondary energy storage capacitance 4. The current $I_L$ in this case flows via the secondary energy storage capacitance 4 and the diode 15. The secondary energy storage capacitance 4 is now charged, with the electrode on the ground side, the electrode 5, being at a negative potential, which is below the ground potential. The diode 15 thus prevents the secondary energy storage capacitance 4 from being discharged.

In order to discharge the secondary energy storage capacitance 4, the secondary switching element 14 is closed, so that a current $I_R$ can flow via the secondary switching element 14, the secondary energy storage capacitance 4 and the energy storage inductance 8. Once the secondary switching element 14 has been opened, the energy storage inductor 8 maintains the current $I_R$, and thus charges the primary energy storage capacitance 3. In the process, a current flows via the primary energy storage capacitance 3 and the primary diode 13. The charge which is stored in the secondary energy storage capacitance 4 is in this way at least partially transferred back to the primary energy storage capacitance 3. The energy which is stored in the secondary energy storage capacitance 4 is therefore not lost completely, but is fed back to the primary energy storage capacitance 3.

The primary diode 13 and the secondary diode 15 are not absolutely essential for the operation of the circuit. In principle, it is also feasible for the primary switching element 12 and the secondary switching element 14 to be closed by a suitable controller whenever a current is intended to flow via the primary switching element 12 and the secondary switching element 14, are to be opened whenever the connection to ground is intended to be interrupted.

The value of the inductance of the filter inductance 2 should be greater than the value of the inductance of the energy storage inductance 8, in order to prevent interference pulses from being fed into the power supply.

In the converter circuit or power output stage which is illustrated in FIG. 2, the parallel-connected combination of the secondary switching element 14 and the secondary diode 15 is connected between the node point 17 and the secondary energy storage capacitance 4. This is particularly important for applications in which the secondary energy storage capacitance is intended to be connected to ground 9, for safety reasons. This makes it possible to ground the housing of a piezo actuator which is used as the secondary energy storage capacitance 4. In this case, however, the so-called high-side switch should be used for the secondary switching element 14, since the secondary switching element 14 would otherwise be at a floating potential.

The power output stage described in FIG. 2 can be used to produce a predetermined voltage profile on the secondary energy storage capacitance 4 precisely from the low DC voltages in the vehicle power supply system of a motor vehicle. In this case, peak voltages in the region of several hundred volts can be achieved without any problems. One particular advantage in this case is the high efficiency of the circuit, since the energy which is stored in the secondary energy storage capacitance 4, a piezo actuator, can be recovered. The circuit is particularly suitable for driving piezo electric or electrostrictive components, which may be a piezo actuator for operation of an injection valve in a direct-injection engine, or else a piezo motor.

Since the power output stage is frequently intended to be used in mobile systems, one aim of the invention is to design this output stage to be as compact as possible. The largest amount of space on a board would be occupied by the two inductances 2 and 8 and the capacitance 3. If, by way of example, the primary energy storage capacitance 3 is optimized by reducing the nominal capacitance, then this leads to greater potential fluctuations during the charging and discharging processes. A required supply voltage VCC is not available for many applications. However, a minimum value is required for this purpose, in order to ensure a desired dynamic response at the output (+V). Only a supply voltage of 12 V or a maximum of 42 volts is generally available for operation of piezo injection valves. However, a supply voltage VCC of more than 70 volts is required for operation of a power output stage of this type. The required voltage is produced by means of a DC/DC converter. However, the DC/DC converter occupies a large amount of physical space, and the costs associated with this are considerable.

FIG. 1 therefore shows an exemplary embodiment in which the solution approach can clearly be seen. In this solution approach, there is no DC/DC converter, and the primary energy storage capacitance 3 is kept as small as possible in order at the same time to avoid the need for a coil with a higher current load capacity. In this case, the input of a circuit can be clocked by an additional switch 20.

The idea of this circuit is for the supply voltage VCC for the output stage to be less than the minimum voltage on the primary energy storage capacitance 3. Pauses, during which the secondary energy storage capacitance 4 is neither being charged nor discharged are in this case used in order to recharge the primary energy storage capacitance 3. This takes place in two steps. In the first step, the switch 20 is closed. The switch 20 short-circuits the primary energy storage capacitance 3, as a result of which a current flows through the path comprising the filter inductance 2, the switch 20 and the energy storage inductance 8. While the switch 20 is opened again after a specific time, energy which was stored in the filter inductance 2 and in the energy storage inductance 8 is used to charge the primary energy storage capacitance 3. The diode 19 prevents the energy from the primary energy storage capacitance 3 from flowing back to the power supply connection VCC again. The first advantage of this circuit concept is that the maximum current which flows through the filter inductance 2 can be determined by the pulse width of the switch 20. A further advantage is that no additional DC/DC converter is required to produce the required supply voltage. Peripheral assemblies, such as those for current measurements on the energy storage conductance 8, can also be used to determine the energy packets for current measurement during recharging of the primary energy storage capacitance 3.

The addition of a diode 19 and a switch 20, as shown in FIG. 1, with a power output stage as shown in FIG. 2 thus allows the primary energy storage capacitance 3 to be bridged briefly, which on the one hand allows the voltage on the primary energy storage capacitance 3 to be varied, and on the other hand allows the maximum current through the filter inductance 2 to be limited.

What is claimed is:

1. A power output stage for capacitive loads comprising:
    an energy storage inductance (8), one end of which is connected to a reference potential (9) and which at the opposite end is connected on the input side to a power supply connection (1) and on the output side to a secondary energy storage capacitance (4);
    a primary energy storage capacitance (3) which is connected upstream of the energy storage inductance (8) on the input side, with the primary energy storage capacitance (3) once again being connected on the input side via a primary switching element (12) with the reference potential (9), and
    a secondary switching element (14) which is connected in series with the secondary energy storage capacitance (4), characterized in that the input of the power output stage is clocked by an additional switch (20).

2. The power output stage as claimed in claim 1, in which the primary switching element (12) is bridged by a primary diode (13) which is reverse-biased for a supply voltage which is applied to the power supply connection.

3. The power output stage as claimed in claim 2, in which the secondary switching element (14) is bridged by a secondary diode (15) which is forward-biased for a supply voltage which is applied to the power supply connection.

4. The power output stage as claimed in claim 1, in which the energy storage inductance (8) is an air-cored coil.

5. The power output stage as claimed in claim 1, in which a filter inductance (2) is connected between the power supply connection (1) and the primary energy storage capacitance (3).

6. The power output stage as claimed in claim 5, in which the filter inductance (2) is an air-cored coil.

7. The power output stage as claimed in claim 1, in which the value of the inductance of the filter inductance (2) is greater than the value of the inductance of the energy storage inductance (8).

8. The power output stage as claimed in claim 1, in which the secondary energy storage capacitance (4) is an elecrostrictive component.

9. The power output stage as claimed in claim 1, in which the secondary energy storage capacitance (4) is a piezo element.

10. The power output stage as claimed in claim 9, in which the piezo element is a piezo actuator which is suitable for operation of valves in an internal combustion engine.

11. The power output stage as claimed in claim 10, in which the piezo element is a piezo actuator which is manufactured using a multilayer technique.

12. The power output stage as claimed in claim 9, in which the piezo element is a piezo actuator which is manufactured using a multilayer technique.

13. A method for operation of a power output stage which comprises:
    charging a primary energy storage capacitance (3) in the pauses during which the secondary energy storage capacitance (4) is neither being charged nor discharged;
    closing a switch (20) in a first step in order to clock the input, so that the primary energy storage capacitance (3) is short-circuited; and
    opening the switch (20) after a specific time, such that the energy which is stored in a filter inductance (2) and in the energy storage inductance (8) is used to charge the primary energy storage capacitance (3).

14. The method as claimed in claim 13, in which a diode (19) which is connected on the input side of the primary energy storage capacitance (3) is used to prevent the energy in the primary energy storage capacitance (3) from flowing back into the supply source.

15. The method as claimed in claim 14, in which the variable pulse width on the switch (20) is used to determine a maximum current which flows through the filter inductance (2).

16. The method as claimed in claim 13, in which the variable pulse width on the switch (20) is used to determine a maximum current which flows through the filter inductance (2).

* * * * *